United States Patent
Allison et al.

(10) Patent No.: US 7,098,576 B2
(45) Date of Patent: Aug. 29, 2006

(54) MICRO-ELECTRICAL-MECHANICAL DEVICE AND METHOD OF MAKING SAME

(75) Inventors: Robert C. Allison, Rancho Palos Verdes, CA (US); Ron K. Nakahira, Fullerton, CA (US); Joon Park, Gardena, CA (US); Brian H. Tran, Rosemead, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 11/031,950

(22) Filed: Jan. 10, 2005

(65) Prior Publication Data
US 2006/0152111 A1    Jul. 13, 2006

(51) Int. Cl.
*H01L 41/08* (2006.01)
(52) U.S. Cl. .................... 310/328; 310/331
(58) Field of Classification Search ........... 310/328, 310/331
See application file for complete search history.

(56) References Cited

U.S. PATENT DOCUMENTS

| | | | |
|---|---|---|---|
| 6,212,056 B1* | 4/2001 | Gammel et al. | 361/277 |
| 6,700,299 B1* | 3/2004 | Quenzer et al. | 310/311 |
| 6,784,766 B1* | 8/2004 | Allison et al. | 333/205 |
| 2001/0045642 A1* | 11/2001 | Farnworth et al. | 257/697 |
| 2004/0094815 A1* | 5/2004 | Park et al. | 257/419 |
| 2005/0146401 A1* | 7/2005 | Tilmans et al. | 333/187 |
| 2005/0184627 A1* | 8/2005 | Sano et al. | 310/363 |

FOREIGN PATENT DOCUMENTS

JP    2004221128    5/2004

OTHER PUBLICATIONS

Park J Y et al; Micromachined, RF MEMS tunable capacitorsusing piezoelectric actuators: 2001 IEE MTT-S International Microwave Symposium Digest, Phoenix, AZ, USA, May 20-25, 2001, vol. 3, 2001, pp. 2111-2114.

* cited by examiner

*Primary Examiner*—Thomas M. Dougherty
(74) *Attorney, Agent, or Firm*—Leonard A. Alkov, Esq.; John E. Gunther; Karl A. Vick

(57) ABSTRACT

A micro-electro-mechanical device including a first substrate; a first contact disposed on a first surface of the substrate; a piezoelectric actuator disposed over the first surface of the substrate; a second contact coupled to the actuator and disposed in proximity to the first contact; a gap control mechanism disposed between the substrate and the actuator for limiting movement of the first contact relative to the second contact. In the exemplary embodiment, the gap control mechanism is a gap control stop constructed of dielectric material. In practice, plural stops are used. In the exemplary embodiment, plural thermosonic bonds are used to connect the actuator to the first substrate. A second substrate is disposed over the piezo-electric actuator. The second substrate has wells over the bonds to facilitate application of a bonding tool to the bonds. The gap control mechanism provides consistent height control between a flipped chip and its base substrate without exposing the assembly to high temperatures.

10 Claims, 3 Drawing Sheets

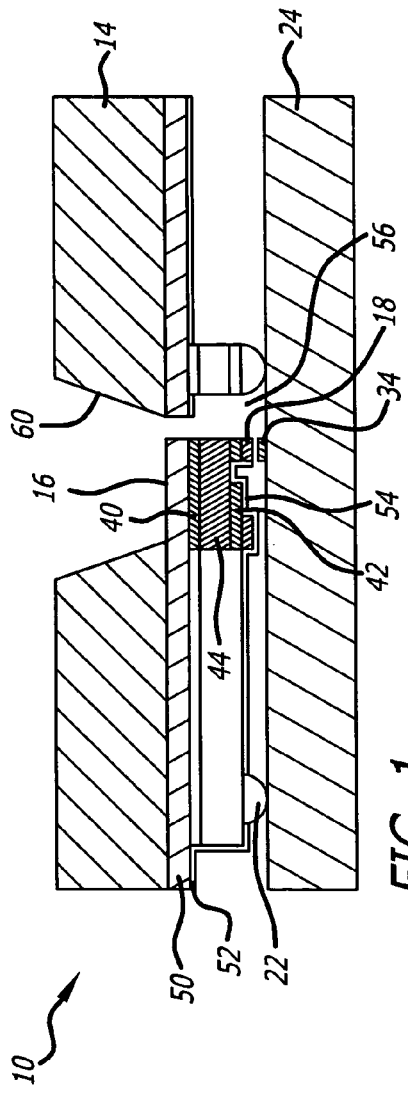
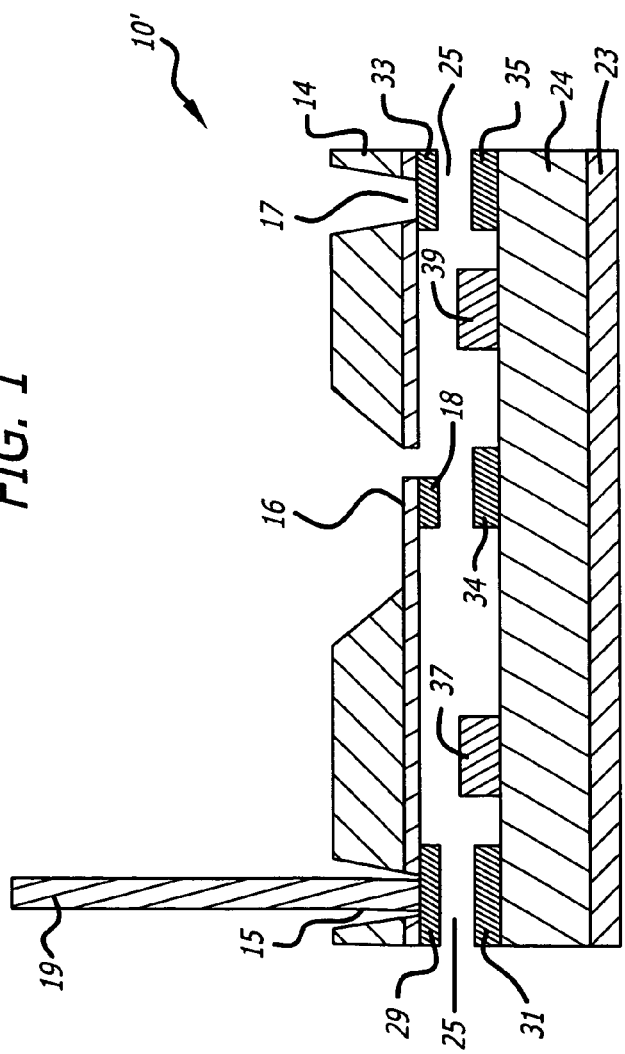

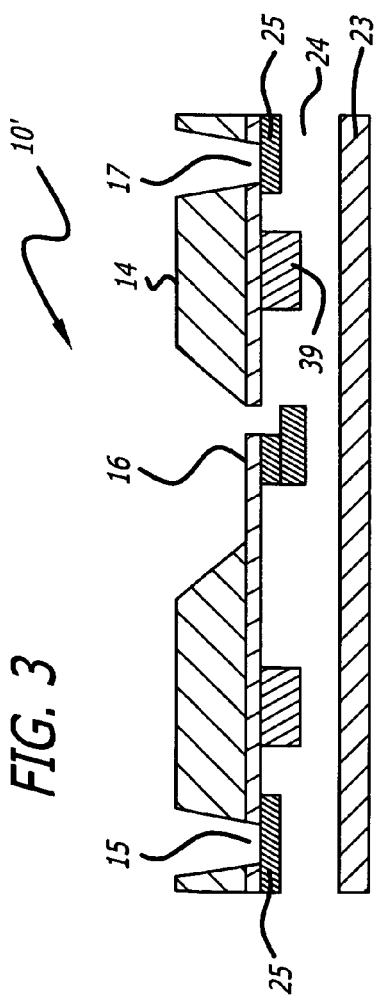
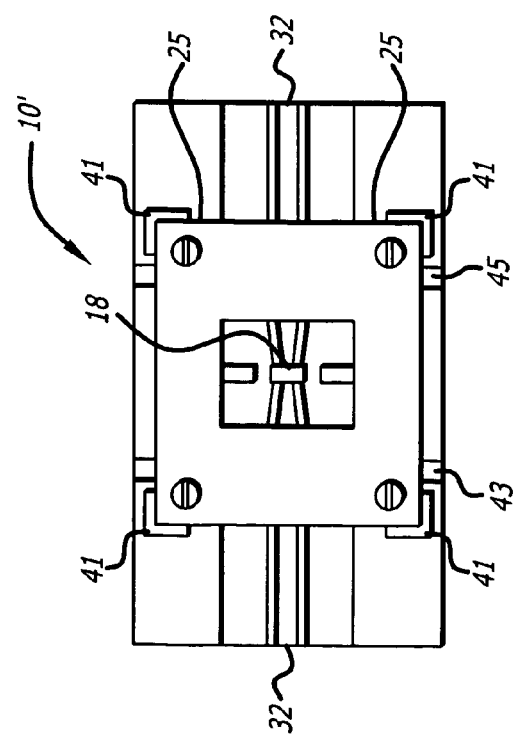
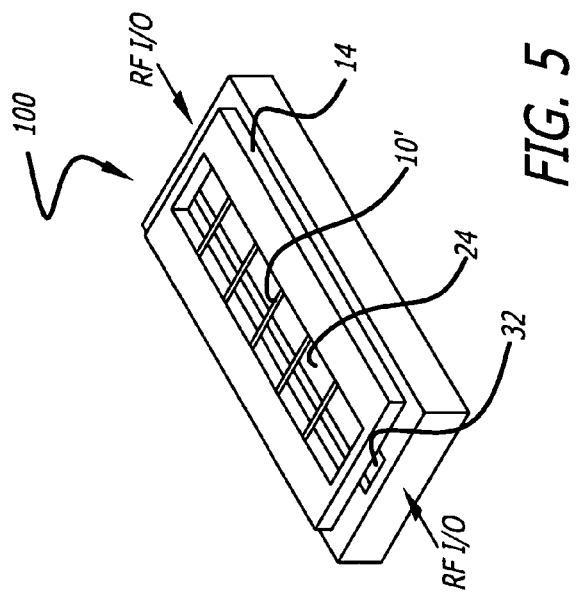

MICRO-ELECTRICAL-MECHANICAL DEVICE AND METHOD OF MAKING SAME

BACKGROUND OF THE INVENTION

1. Field of the Invention

The present invention relates to electrical and electronic components, circuits and devices. More specifically, the present invention relates to electrical and electronic components implemented with micro-electro-mechanical (EMS) devices.

2. Description of the Related Art

Various electrical and electronic devices are being implemented in MEMS technology. MEMS technology offers lower losses than conventional implementations of discrete components. Unfortunately, for certain types of components such as variable capacitors, prior MEMS designs have not taken full advantage of the low loss potential of MEMS technology. These prior approaches have been somewhat lossy due to parasitic effects associated with the actuation mechanism of the MEMS devices.

Further, prior MEMS designs have used electrostatic actuation and bimetal strip approaches. Unfortunately, electrostatic attraction is impractical for a variable capacitor implementation and the bimetal approach has been found to be too slow and requires too much power.

Hence, a need existed in the art for an improved variable capacitor design implemented with MEMS technology. This need was met by the teachings of U.S. patent application Ser. No. 10/294,413 entitled MICRO ELECTRO-MECHANICAL SYSTEM DEVICE WITH PIEZOELECTRIC THIN FILM ACTUATOR, filed Nov. 14, 2002 by J. Park et al., the teachings of which are incorporated herein by reference. This application discloses and claims a radio frequency MEMS device with a piezoelectric thin film actuator disposed over a substrate and conductive bumps which serve as spacers. In one embodiment, the device is disclosed as being usable as a tunable capacitor in which the inter-electrode spacing between a conducting path electrode and an RF path electrode is controllably varied by an actuator beam in order to selectively vary the capacitance between the electrodes.

These devices, known as 'flip-chips' due to the upside down orientation thereof relative to conventional designs, are typically assembled by screen printing solder paste or conductive epoxy and reflowed at temperatures above 150 degrees Celsius. Unfortunately, these methods cannot be used in applications requiring strict control of the height gap between the flip chip and the substrate that the flip chip is mounted on. The height is not controlled well because the volume of paste or solder has too much variability and a consistent height cannot be achieved. This is particularly problematic with respect to the construction of tunable capacitors.

Most attempts at controlling the height requirement have involved efforts to develop better, more consistent bumps or by controlling the volume of screen-printed material. The bump process is a process that involves many variables that are difficult to control. Bumps are often plated using pulse plating and checked quite often to achieve optimal height. As an alternative, the bumps are lapped afterward to a specific height. This can yield a very uniform bump-to-bump height, but it does not compensate for the variation of volume of the screen printed solder paste or conductive epoxy.

The screen-printed material depends greatly on the tolerances of either the machined stencil or the emulsion on the screen. Laser machined or chemical etch stencils will typically have a tolerance of +/−0.001 mil., which can result in great volume changes if the opening in the stencil is small such as 0.004". Emulsion screens provide inconsistent volume deposition because of the screen mesh that impedes the flow of material.

Another approach is to assemble the flip chip using thermal compression of the entire chip onto malleable pads. This method yields devices that assemble well at temperatures above 150 degrees Celsius, but the pad height is still difficult to control.

Hence, while the above-referenced application addresses the need in the art, a need remains in the art for an RF MEMS design that is easier to manufacture and an improved associated manufacturing method.

SUMMARY OF THE INVENTION

The need in the art is addressed by the micro-electromechanical device of the present invention and the method of making same. In the illustrative embodiment, the inventive device includes a first substrate; a first contact disposed on a first surface of the substrate; a piezoelectric actuator disposed over the first surface of the substrate; a second contact coupled to the actuator and disposed in proximity to the first contact; and a gap control mechanism disposed between the substrate and the actuator for limiting movement of the first contact relative to the second contact.

In the exemplary embodiment, the gap control mechanism is a gap control stop constructed of dielectric material. In practice, plural stops are used. In the exemplary embodiment, plural thermosonic bonds are used to connect the actuator to the first substrate. A second substrate is disposed over the piezo-electric actuator. The second substrate has wells over the bonds to facilitate application of a bonding tool to the bonds.

BRIEF DESCRIPTION OF THE DRAWINGS

FIG. 1 is a cross-sectional side view of the MEMS device disclosed and claimed in the Park et al application.

FIG. 2 is a cross-sectional side view of an illustrative embodiment of a MEMS device in disassembled relation and implemented in accordance with the present teachings.

FIG. 3 is a cross-sectional side view of a MEMS device of FIG. 2 in assembled relation.

FIG. 4 is a top view of a single MEMS variable capacitor mounted across a CPW transmission line in an illustrative phase shifter implementation in accordance with the present teachings.

FIG. 5 is a perspective view of an illustrative implementation of a loaded line phase shifter utilizing MEMS variable capacitors in accordance with the present teachings.

DESCRIPTION OF THE INVENTION

Figure 6:
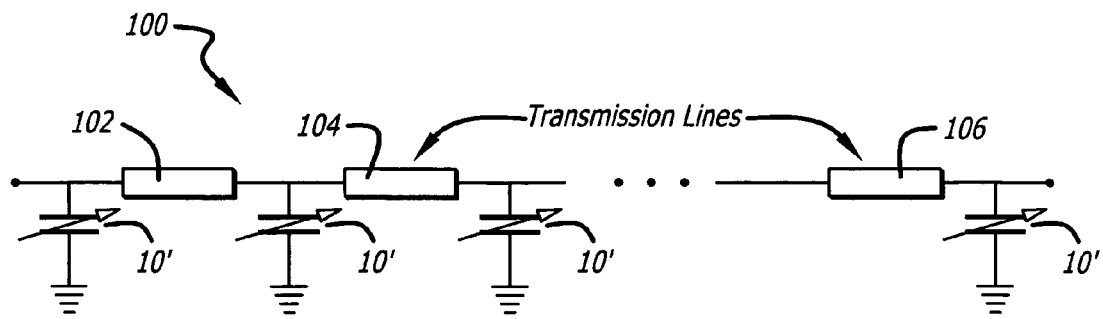
FIG. 6 is a schematic diagram of the illustrative implementation of a loaded line phase shifter utilizing MEMS variable capacitors of FIG. 5.

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

FIG. 1 is a cross-sectional side view of the MEMS device 10 disclosed and claimed in the Park et al application, the teachings of which are incorporated by reference herein. As shown in FIG. 1, the device 10 includes a semiconductor substrate 14, a piezoelectric thin film actuator 16 mounted on the substrate 14, a conducting path electrode 18 driven by the piezoelectric thin film actuator 16, conductive bumps 22 which are connected to an external voltage source (not shown) and provide the voltage necessary for operating the device 10, an RF circuit substrate 24, and RF-in and RF-out path electrodes 32 and 34 mounted on the RF circuit substrate 24 so as to be spaced from the conducting path electrode 18. The piezoelectric thin film actuator 16 is fabricated in conjunction with the semiconductor substrate 14 and transferred to the RF circuit substrate 24 using flip chip technology, for example. It is noted that in the illustrated embodiment the bumps shown in the right side of FIG. 1 act as spacers, although the bumps could alternatively form part of another device, if desired.

The piezoelectric thin film actuator 16 may comprise any suitable material having piezoelectric properties, for example, lead zirconate titanate (PZT).

The PZT thin film actuator 16 includes a pair of electrodes 40 and 42, a piezoelectric layer 44 made of lead zirconate titanate (PZT) disposed between the electrodes 40 and 42, and an elastic layer 50 disposed between the electrode 40 (the upper electrode in FIG. 1) and the semiconductor substrate 14.

An isolation layer 52 is provided adjacent the elastic layer 50 and prevents or at least substantially reduces electrical arcing between the 40 and 42. The PZT thin film actuator 16 has a fixed proximal end 54 adjacent the semiconductor substrate 14 and a free distal end 56 extending into a trench region 60 of the substrate 14. The PZT thin film actuator 16 thus forms a cantilever beam, which is moveable within the trench region 60.

In the illustrated exemplary embodiment, the conducting path electrode 18 is transverse the longitudinal extent of the PZT thin film actuator 16. Thus, the conducting path electrode is perpendicular to the plane of the page. Similarly, the RF-in and RF-out path electrodes 32 and 34 are transverse the longitudinal extent of the PZT thin film actuator 16, as is shown in FIG. 1.

The RF MEMS device 10 in accordance with the invention may be used as a switch with controllable displacement or as a tunable capacitor for varying the capacitance between the electrodes 32 and 34. During operation; the RF MEMS device 10 changes the distance of the gap between the conducting path electrode 18 and the RF-in and RF-out path electrodes 32 and 34. More particularly, as the voltage source increases and decreases the voltage potential applied to the electrodes 40 and 42, the PZT layer 44 changes its dimension in length, that is, the PZT layer 44 respectively expands and contracts. The elastic layer 50, in turn, converts the expanding and contracting of the PZT layer 44 into upward and downward movement of the cantilevered or distal end portion 56 of the PZT thin film actuator 16. When bent downward, the distal end 56 urges the conducting path electrode 18 closer to or in contact with the RF-in and RF-out path electrodes 32 and 34. When bent upward, the distal end 56 urges the conducting path electrode 18 away from the RF-in and RF-out path electrodes 32 and 34.

The PZT thin film actuator 16 thus actively controls the displacement between the conducting path electrode 18 and the RF-in and RF-out path electrodes 32 and 34. The amount of displacement depends on mainly the driving voltage, and the dimensions of the PZT thin film actuator 16, including the dimensions of the PZT layer 44 and the elastic layer 50.

When employed as a switch, the RF MEMS device 10 can close the spacing between the conducting path electrode 18 and the RF-in and RF-out path electrodes 32 and 34, and thus turn on the switch, or open the spacing and thus turn off the switch. The RF MEMS device may also be employed as a tunable capacitor in which the interelectrode spacing between the conducting path electrode 18 and the RF-in and RF-out path electrodes 32 and 34 is controllably varied by the PZT thin film actuator 16 in order to selectively vary the tuning capacitance in between.

As noted above, these devices, known as 'flip-chips' due to the upside down orientation thereof relative to conventional designs, are typically assembled by screen printing solder paste or conductive epoxy and reflowed at temperatures above 150 degrees Celsius. Unfortunately, these methods cannot be used in applications requiring strict control of the gap height between the flip chip and the substrate on which it is mounted. The height is not controlled well because the volume of paste or solder has too much variability and a consistent height cannot be achieved. This is particularly problematic with respect to the construction of tunable capacitors.

Most attempts at controlling the height have involved efforts to develop better, more consistent bumps or by controlling the volume of screen-printed material. The bump process is a process that involves many variables that are difficult to control. Bumps are often plated using pulse plating and checked quite often to achieve optimal height. As an alternative, the bumps are lapped afterward to a specific height. This can yield a very uniform bump-to-bump height, but it does not compensate for the variation of volume of the screen printed solder paste or conductive epoxy.

The screen-printed material depends greatly on the tolerances of either the machined stencil or the emulsion on the screen. Laser machined or chemical etch stencils will typically have a tolerance of +/−0.001 mil., which can result in great volume changes if the opening in the stencil is small such as 0.004". Emulsion screens provide inconsistent volume deposition because of the screen mesh that impedes the flow of material.

Another approach is to assemble the flip chip using thermal compression of the entire chip onto malleable pads. This method yields devices that assemble well at temperatures above 150 degrees Celsius, but the pad height is still difficult to control with this process.

Hence, while the above-referenced application addresses the need in the art, a need remains in the art for an RF MEMS design that is easier to manufacture and an improved manufacturing method therefor. The need is addressed by the micro-electro-mechanical device and method of the present invention.

FIG. 2 is a cross-sectional side view of an illustrative embodiment of a MEMS device 10' in disassembled relation and implemented in accordance with the present teachings. As shown in FIG. 2, the design of the inventive device 10' is substantially similar to the prior design 10 with the exception that the conductive bumps are replaced by bonds of gold or other suitable material, gap stops are included between the actuator and the substrate and holes are provided in the substrate to facilitate welding or bonding.

Hence, in the illustrative embodiment, the inventive device 10' includes a base substrate 24 disposed over a layer of metallization 23 which, depending on the application, may serve as a co-planar wave (CPW) transmission line. In the illustrative embodiment, the base substrate is fabricated of alumina. However, those of ordinary skill in the art will appreciate that the base 24 may be implemented with quartz, gallium arsenide, Duroid or other suitable transmission line dielectric medium.

The transmission line 23 provides for input and output of radio frequency (RF) signals. A first contact 34 is disposed on an upper surface of the base substrate 24. As per the embodiment of FIG. 1, a piezoelectric actuator 16 is disposed over the upper surface of the substrate 24. A second contact 18 is coupled to the actuator 16 and disposed in proximity to the first contact 34. In accordance with the present teachings, a gap control mechanism is disposed between the base substrate 24 and the actuator for limiting movement of the first contact relative to the second contact; In the illustrative embodiment, the gap control mechanism is provided by a plurality of gap control stops 37 and 39 of which only two are shown in FIG. 2. In the exemplary embodiment, the gap control stops are fabricated of photo resist or other dielectric material. In practice, plural stops are used. Those skilled in the art will appreciate that the present teachings are not limited to the number, placement or construction of the stops.

In the exemplary embodiment, plural thermosonic bonds 25 are used to connect the actuator 16 to the base substrate 24. As per the embodiment of FIG. 1, a second substrate 14 is disposed over the piezo-electric actuator 16. In the illustrative embodiment, the second substrate is silicon. However, other materials may be used and or removed completely without departing from the scope of the present invention. The second substrate 14 has wells 15 and 17 over the bonds 25 to facilitate application of a bonding tool thereto.

The device 10' is fabricated on silicon and is flipped onto the alumina base. Hence, the designation "flip chip". A capacitance is developed between electrodes 34 on the alumina circuit and on dielectric 18 attached to the piezo-electric actuator. Losses are low because the capacitor dielectric is air and the metallization on the capacitor electrodes is gold. The electrode on the MEMS device is actually two electrodes forming back-to-back series capacitors as shown in FIG. 6. With this feature, no RF path exists on the piezoelectric material or silicon substrate which would compromise insertion loss performance.

To construct the device 10', in the illustrative embodiment, a photoresist of appropriate depth (e.g. 2 microns) is spun on the base 24 and the height is controlled (e.g. to approximately +/−200 angstroms). A photo mask may be used to locate four posts near the periphery of the chip in areas of base substrate which will serve as the gap stops. The alumina base substrate 24 is placed on a bonder such as a Hybond Model 676 Utrasonic thermosonic wire bonder with a SPT (single point protruding-v tab) tool 19. The silicon chip is placed and located using outside alignment targets on the base substrate. After alignment is completed the gold to gold (Au—Au) bonds 25 are welded through the holes 15 and 17 in the silicon substrate 14.

In the illustrative embodiment, attachment and electrical connection is made by thermosonically bonding the upper pad 29 of the gold bond 25 on the underside of the actuator 16 to the lower pad 31 of the gold bond 25 on the base substrate 24 using a modified thermosonic wedge bonding tool 19 through holes in the flip chip substrate. By bonding through holes in the flip chip substrate the thermosonic power is utilized more effectively than if it was applied to the top of the substrate, thus a better bond can be achieved.

In an illustrative embodiment, the holes 15, 17 in the silicon substrate 14 are deep reactive ion etched to expose nitride layers 50 under the gold pads (This is disclosed in the above referenced Park et al application. The thermosonic bonding parameters for the illustrative embodiment are 150 mW of ultrasonic power, 500 ms duration, and 286 g of force. This high force, high power, and long length of time is needed to penetrate through the nitride layers on the silicon and weld the upper and lower pads together to provide the bonds 25.

FIG. 3 is a cross-sectional side view of a MEMS device of FIG. 2 in assembled relation. Note that when assembled, the upper and lower pads are welded together to provide the bonds 25 and the gap control stops extend fully between the base substrate 24 and the actuator 16.

FIG. 4 is a top view of a single MEMS variable capacitor mounted across a CPW transmission line in an illustrative phase shifter implementation in accordance with the present teachings. As shown in FIG. 4, the device 10' is aligned using four alignment targets 41. The inventive flip chip 10' is secured on the base substrate (not shown) using four bonds 25 at the corners thereof. Lines 43 and 45 allow for the application of actuation signals to the piezo-electric actuator 16. The dark rectangle in middle of the device is capacitor electrode suspended between piezo-electric actuators. In FIGS. 2–4, note the removal of the upper silicon substrate 14 in the region of the capacitor so that no lossy material would be in the region of the resonant structures.

FIG. 5 is a perspective view of an illustrative implementation of a loaded line phase shifter utilizing MEMS variable capacitors in accordance with the present teachings. In FIG. 5, the silicon substrate 14 is shown flipped with the center section etched away as discussed above. Below the substrate 14, plural variable capacitors 10' are disposed over a substrate 24. A CPW transmission line 34 is disposed above the substrate 24 to provide RF input and output. FIG. 6 is a schematic diagram of the illustrative implementation of a loaded line phase shifter utilizing MEMS variable capacitors of FIG. 5. As is evident from FIG. 6, CPW transmission lines 102 are periodically spanned by the variable capacitor electrodes forming shunt capacitors symmetrically to both ground conductors. In the illustrative embodiment, 8 capacitor electrodes are used.

Figure 7:
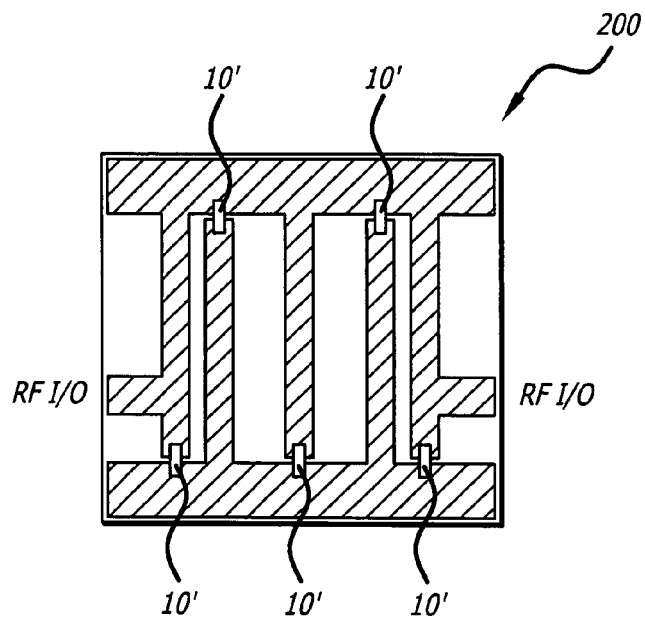
FIG. 7 is a sectional top view of a circuit layout of a 5 section interdigitated microstrip coupled transmission line band pass filter utilizing the variable MEMS capacitors of the present invention.

FIG. 7 is a sectional top view of a circuit layout of a 5 section interdigitated microstrip coupled transmission line band pass filter 200 utilizing the variable MEMS capacitors 10' of the present invention.

Figure 8:
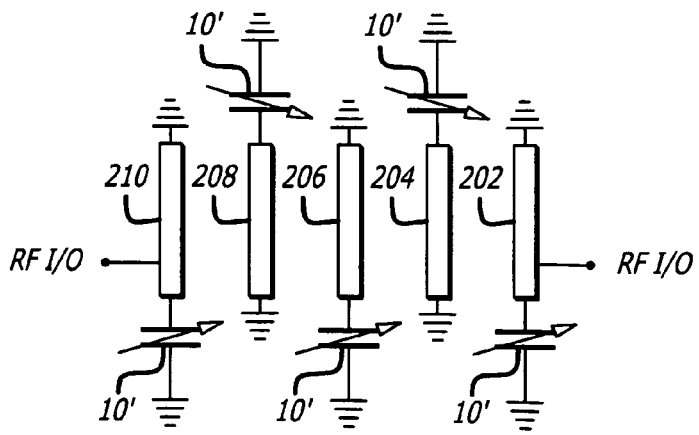
FIG. 8 shows a schematic diagram for interdigitated microstrip coupled transmission line band pass filter of FIG. 7.

FIG. 8 shows a schematic diagram for interdigitated microstrip coupled transmission line band pass filter 200 of FIG. 7. As shown in FIGS. 7 and 8, variable capacitance loading on the ends of the transmission line resonators 202–210 (even numbers only) allows tuning of the center frequency of the pass band. Illustrative locations of the piezo-electrically actuated capacitor electrodes are indicated in FIG. 7. As per the phase shifter circuit 100 of FIGS. 5 and 6, the MEMS devices are mounted on a single silicon substrate that is flipped onto the alumina circuit. The center of the silicon substrate is again etched away so that no lossy material would be in the region of the resonant structures. RF signals are input to and output from the filter 200 via the first and fifth resonators 202 and 210 respectively. The RF signals are then coupled between the resonators.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A micro electromechanical device comprising:
   a first substrate;
   a first contact disposed on a first surface of said substrate;
   a piezoelectric actuator disposed over said first surface of said substrate;
   a second contact coupled to said actuator and disposed in proximity to said first contact; and
   a gap control means disposed between said substrate and said actuator for limiting movement of said first contact relative to said second contact.

2. The invention of claim 1 wherein said gap control means includes a first gap control stop.

3. The invention of claim 2 wherein said control stop is a dielectric material.

4. The invention of claim 2 wherein said gap control means includes a second gap control stop.

5. The invention of claim 1 further including plural bonds between said actuator and said first substrate.

6. The invention of claim 5 wherein said bonds are thermosonic gold—gold bonds.

7. The invention of claim 6 further including a second substrate disposed over said piezo-electric actuator.

8. The invention of claim 7 wherein said second substrate has wells over said bonds to facilitate application of a bonding tool to said bonds.

9. The invention of claim 1 further including a layer of metallization under a second surface of said second substrate.

10. A micro electro mechanical variable capacitor comprising:
    a first substrate;
    a first contact disposed on a first surface of said substrate;
    a piezoelectric actuator disposed over said first surface of said substrate;
    a second contact coupled to said actuator and disposed in proximity to said first contact; and
    a dielectric material disposed between said substrate and said actuator for limiting movement of said first contact relative to said second contact.

* * * * *